United States Patent [19]

Kitajima

[11] Patent Number: 5,327,866
[45] Date of Patent: Jul. 12, 1994

[54] IGNITION TIMING CONTROL SYSTEM FOR INTERNAL COMBUSTION ENGINE

[75] Inventor: Sinichi Kitajima, Wako, Japan

[73] Assignee: Honda Giken Kogyo Kabushiki Kaisha, Tokyo, Japan

[21] Appl. No.: 994,753

[22] Filed: Dec. 22, 1992

[30] Foreign Application Priority Data

Dec. 24, 1991 [JP] Japan ................... 3-340778

[51] Int. Cl.⁵ ............................. F02P 5/00
[52] U.S. Cl. ........................ 123/406; 123/1 A
[58] Field of Search ............ 123/406, 1 A, 1 R

[56] References Cited

U.S. PATENT DOCUMENTS

| | | | |
|---|---|---|---|
| 4,481,908 | 11/1984 | Iida | 123/1 A |
| 4,913,099 | 4/1990 | Ota | 123/1 A |
| 5,056,490 | 10/1991 | Kashima | 123/1 A |
| 5,191,869 | 3/1993 | Kamioka et al. | 123/1 A |

*Primary Examiner*—Raymond A. Nelli
*Attorney, Agent, or Firm*—Nikaido, Marmelstein, Murray & Oram

[57] ABSTRACT

An ignition timing control system for an internal combustion engine having a catalytic converter in its exhaust system and using a gasoline-alcohol blend fuel. Since the combustion temperature of the alcohols is lower than that of gasoline, the temperature of the exhaust gas decreases with increasing alcohol concentration of the fuel, which slows the heating of the catalyst and thus delays its activation, thereby degrading exhaust emission. In order to avoid this, ignition timing is retarded at cold engine starting with increasing alcohol concentration in the fuel so as to raise the exhaust gas temperature and promote the reactions in the catalytic converter. The retard amount is further adjusted by the manifold pressure and the intake air temperature.

13 Claims, 4 Drawing Sheets

IGNITION TIMING CONTROL SYSTEM FOR INTERNAL COMBUSTION ENGINE

BACKGROUND OF THE INVENTION

1. Field of the Invention

This invention relates to an ignition timing control system for an internal combustion engine which uses a hybrid fuel containing alcohol.

2. Description of the Prior Art

For controlling the exhaust gases emitted by an automobile engine, it is a common practice to install a catalytic converter such as a three-way catalyst in the engine exhaust system. For coping with the fact that the catalysts including of this type of converter are inactive below a certain temperature, it is also a common practice to employ a system for quickly activating the catalyst after a cold engine start by retarding the ignition timing and thus quickly raising the exhaust gas temperature when the engine coolant temperature is low.

However, in such systems, a problem arises when the engine uses a fuel containing an alcohol such as methyl alcohol. Since the combustion temperature of alcohols is lower than that of gasoline, the temperature of the exhaust gas decreases with increasing alcohol concentration of the fuel. This slows the heating of the catalyst and thus delays its activation, with the result that the quality of the exhaust emissions is degraded.

SUMMARY OF THE INVENTION

This invention was accomplished for overcoming this problem and its object is to provide a system which prevents degradation of exhaust emissions in an engine using a fuel containing alcohol by controlling the ignition timing so as to quickly raise the catalyst temperature.

For realizing these objects, the present invention provides a system for controlling ignition timing of an internal combustion engine having a catalytic converter in its exhaust system and using a gasoline-alcohol blend fuel. The system comprises first means for detecting alcohol concentration in the fuel and control means for determining an ignition timing of the engine, wherein the control means retarding the ignition timing in response to the detected alcohol concentration.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENT

Figure 1:
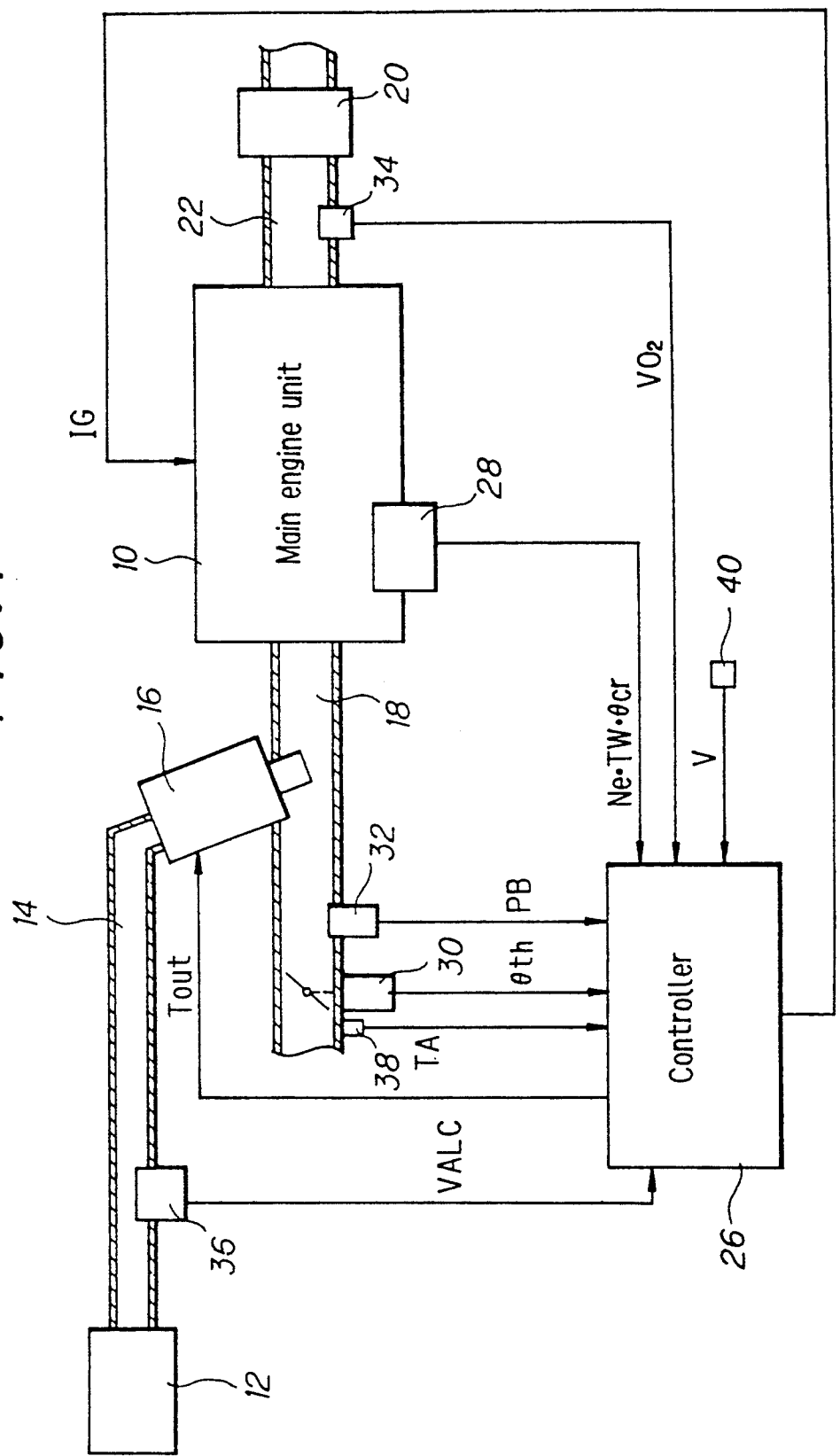
FIG. 1 is an overall schematic view of an ignition timing control system for an internal combustion engine according to the invention.

In FIG. 1, reference numeral 10 designates a main unit of an internal combustion engine. Fuel containing methanol or some other alcohol is supplied from a fuel tank 12 via a fuel line 14 to a fuel injection nozzle 16 installed in an air intake manifold 18 of the main engine unit 10. A catalytic converter 20 such as a three-way catalyst is installed in an exhaust pipe 22 of the main engine unit 10.

The amount of fuel injected by the fuel injection nozzle 16 and the ignition timing are controlled by a controller 26 including a microcomputer. The controller 26 receives detection signals representing the engine speed Ne, the coolant temperature TW and the crank angle $\theta$cr from a engine sensor unit 28 that is mounted on the engine and includes a number of different kinds of sensors. It also receives a detection signal representing the throttle opening degree $\theta$th from a throttle position sensor 30, a detection signal representing the intake manifold pressure PB from a manifold absolute pressure sensor 32, a detection signal representing the oxygen content $VO_2$ of the exhaust gas from an oxygen content sensor 34, a detection signal representing the alcohol content VALC of the fuel from an alcohol concentration sensor 36 mounted in the fuel line 14, a detection signal representing the intake air temperature TA from a manifold air temperature sensor 38, and a detection signal representing the traveling speed V, of a vehicle on which the engine main unit 10 is mounted, from a vehicle speed sensor 40. Based on these signals, the controller 26 calculates the amount of fuel to be injected and the ignition timing IG. The ignition timing IG is calculated as $$IG = IGi - IGr + A$$

where ignition advance is defined as being positive, IGi is a basic ignition timing retrieved from a look-up table(s) using Ne and PB and VALC as address data, IGr is an ignition retard amount calculated in the manner explained below, and A is a term representing various corrections. The data are predetermined separately for respective alcohol concentrations.

Figure 2:
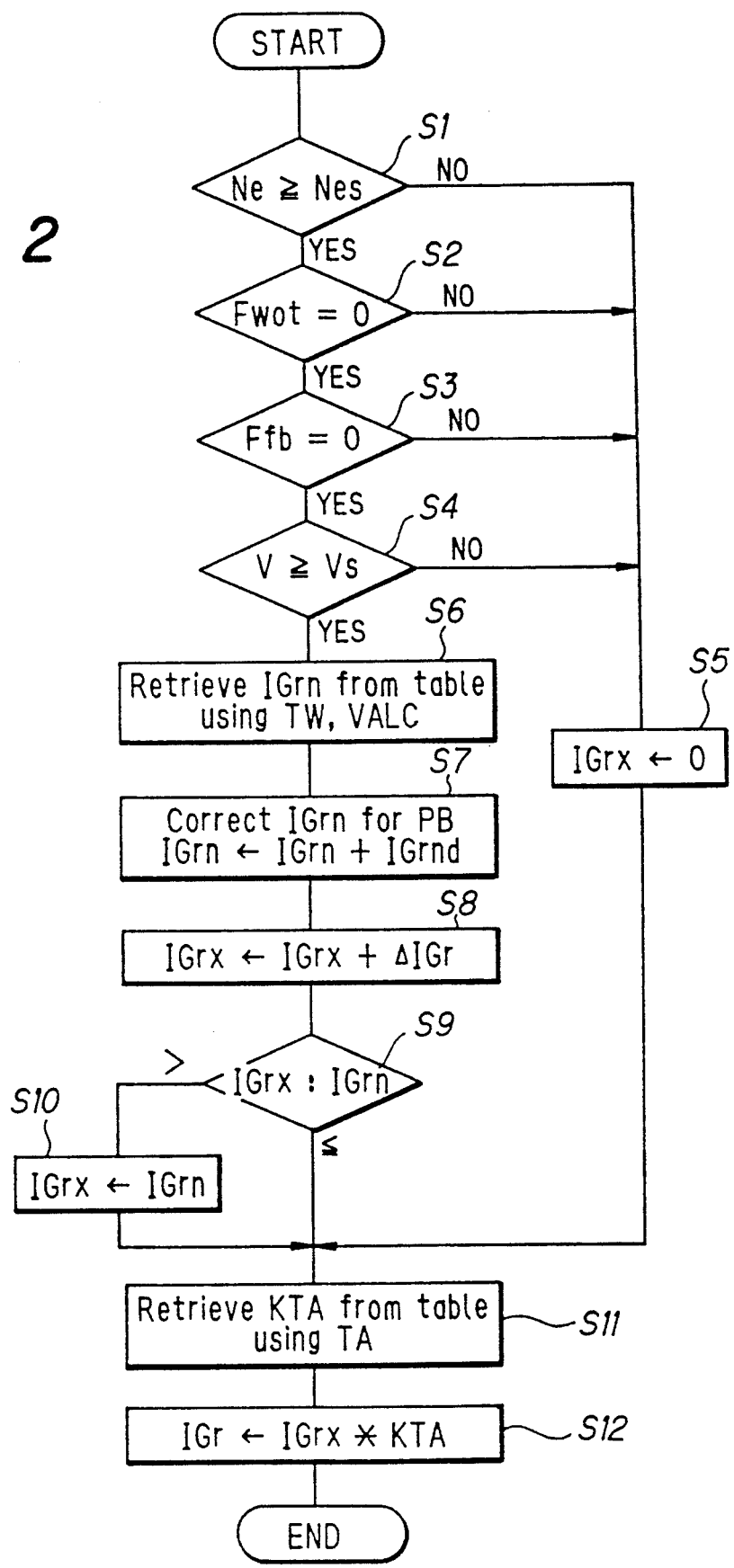
FIG. 2 is a flow chart showing the operation of the system shown in FIG. 1.

FIG. 2 is a flow chart showing the operation of the system shown in FIG. 1, in particular showing the determination procedures of a subroutine for calculating the retard amount IGr.

In step S1 through step S4 it is checked if the current operating condition is such that the ignition timing may be retarded.

More specifically, it is checked in step S1 if the engine speed Ne is at or above a prescribed value Nes. This is done because retarding the ignition timing will make the engine rotation unstable if the engine speed is too low. If it is found that Ne<Nes, control passes to step S5 in which the value of IGrx, the basic value used in calculating the aforesaid retard amount IGr, is set to zero, and no retard processing is conducted. The prescribed value Nes includes hysteresis. For example, it is initially set at 1,000 rpm, but once the engine speed Ne exceeds this value, the engine speed Ne is judged to be not less than the prescribed value Nes down to a lower value of, say, 950 rpm. If Ne≧Nes, control passes to step S2.

In step S2, it is then checked if a high-load increased fuel injection flag Fwot (the bit of which is set to 1 when the amount of fuel injected is increased under high load) is set to zero and, if the result is negative (if Fwot=1), control passes to step S5 and retard processing is not conducted. This is done because retarding the ignition timing when the flag Fwot=1 degrades the acceleration performance of the engine. When the flag Fwot=0, control passes to step S3.

In step S3, it is checked if an idle feedback flag Ffb (whose bit is set to 1 when feedback control is conducted for maintaining a constant idling speed) is set to zero and, if the result is negative (Ffb=1), control passes to step S5 and retard processing is not conducted. This is done because processing for retarding the ignition timing conducted while the flag Ffb=1 disturbs the feedback control and causes the engine rotation to become unstable. When the flag Ffb=0, control passes to step S4.

In step S4, a discrimination is still made as to whether or not the vehicle speed V is at or above a reference speed Vs set at a very low value (e.g. 5 km/h), and if V<Vs, control passes to step S5 and retard processing is not conducted. This is done because the inertial force of the vehicle body is not large enough to stabilize the engine rotation when V<Vs, so that retarding the ignition timing under this condition would cause the engine rotation to become unstable. When V≧Vs, control passes to step S6.

Figure 3:
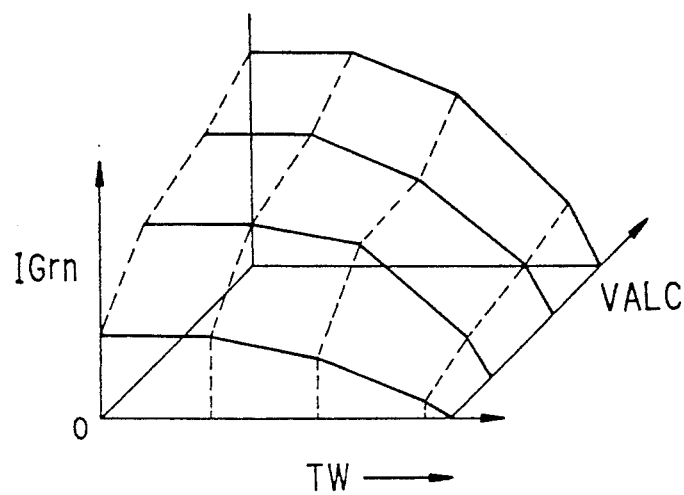
FIG. 3 is a graph showing the characteristics of a look-up table(s) of a target retard amount IGrn defined with respect to the alcohol concentration VALC and the coolant temperature TW.

The retard processing is conducted from step S6 onward. In step S6, the coolant temperature TW and the alcohol concentration VALC are used as address data for retrieving from a look-up table(s) of a target retard amount IGrn that corresponds to the values of TW and VALC at that instant. So as to compensate for the decrease in exhaust gas temperature with increasing value of VALC and thus to improve the temperature increase characteristics of the catalytic converter 20, the characteristics of the table is arranged such that the target retard amount IGrn increases with increasing alcohol concentration VALC, as shown in FIG. 3. Further, so as to compensate for the lower exhaust gas temperature while the engine is running cold, the table is arranged such that the target retard amount IGrn increases with decreasing coolant temperature TW.

Figure 4:
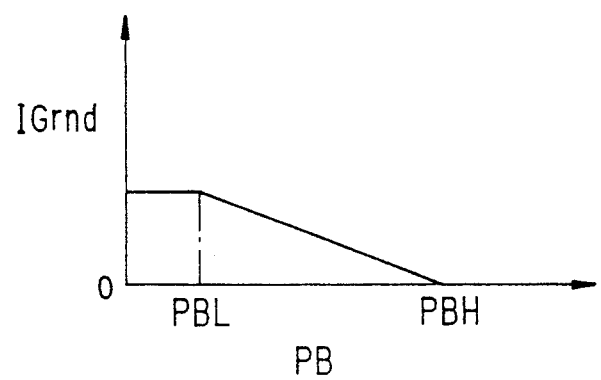
FIG. 4 is a graph showing the characteristics of a look-up table(s) of a correction value IGrnd for the target retard amount IGrn defined with respect to the intake manifold pressure PB.

Moreover, when the intake manifold pressure PB decreases (increases in negative pressure value) owing to reduced engine load, the amount of fuel injected also decreases, lowering the exhaust gas temperature. Since it is preferable to compensate for this temperature drop, in step S7 the target retard amount IGrn is corrected for the intake manifold pressure PB. This correction is conducted by using the manifold pressure PB for retrieving a correction value IGrnd from a correction table and adding the retrieved value to the target retard amount IGrn. FIG. 4 shows the characteristics of the table. As illustrated, the value IGrnd is zero during high load operation when the manifold pressure PB is at or over a prescribed upper limit value PBH (e.g. −99 mmHg in negative pressure), increases as the manifold pressure PB decreases below the upper limit value PBH, and then becomes a prescribed fixed value during low load operation when the manifold pressure PB is lower than a prescribed lower limit value PBL (e.g. −450 mmHg in negative pressure).

Control then passes to step S8 in which a prescribed unit amount delta IGr is added to the basic value IGrx in the preceding cycle to obtain that for the current cycle, and to step S9 in which the so-obtained value IGrx is compared with the target retard amount IGrn. The unit amount delta IGr is added to the value IGrx in each succeeding cycle until the value IGrx becomes larger than the target retard amount IGrn, at which time the value IGrx is replaced with the target retard amount IGrn in step s10. In other words, the value IGrx is progressively incremented until the target retard amount IGrn is reached.

Figure 5:
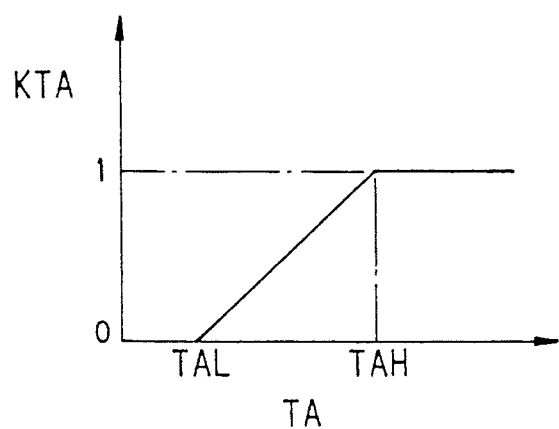
FIG. 5 is a graph showing the characteristics of a look-up table of a correction coefficient KTA for a basic value IGrx of an actual retard amount IGr defined with respect to the intake air temperature TA.

Next, in step S11, a correction coefficient KTA related to the intake air temperature TA is retrieved from a table, and, in step S12, the aforesaid actual retard amount IGr is calculated as the product of the value IGrx and the coefficient KTA. As the intake air temperature TA decreases, the air-fuel mixture becomes increasingly difficult to ignite. Thus at lower intake air temperatures, retarding the ignition timing leads to an increase in the amount of unburned components in the exhaust gas, namely to more harmful exhaust emissions. Therefore, as shown in FIG. 5, the characteristics of the KTA table is arranged such that the coefficient KTA is zero and, accordingly, the retard amount IGr is zero, when the temperature TA is at or below a prescribed lower limit value TAL (e.g. 10° C.). Between the lower limit value TAL and a prescribed upper limit value TAH (e.g. 25° C.), the coefficient KTA increases from zero to 1 as the temperature TA increases.

The ignition timing IG will be calculated on the basis of the retard amount IGr obtained in the foregoing manner. Conducting ignition at this ignition timing prevents lowering of the exhaust gas temperature, in this way promoting the reactions in the catalytic converter 20.

The present invention has thus been shown and described with reference to the specific embodiments. However, it should be noted that the present invention is in no way limited to the details of the described arrangements, but changes and modifications may be made without departing from the scope of the appended claims.

What is claimed is:

1. A system for controlling ignition timing of an internal combustion engine having a catalytic converter in an exhaust system thereof and using a gasoline-alcohol blend fuel, said system comprising:

first means for detecting alcohol concentration in the fuel;

second means for detecting a temperature of the engine; and control means for determining an ignition timing of the engine, wherein said control means retards the ignition timing in response to the detected alcohol concentration when the detected temperature of the engine is at or below a predetermined temperature.

2. A system according to claim 1, wherein said control means retards the ignition timing by a first amount which increases with increasing alcohol concentration.

3. A system according to claim 1, wherein said control means retards the ignition timing by an amount which increases with decreasing detected engine temperature.

4. A system according to claim 1, further including:

third means for detecting a manifold pressure of the engine; and said control means retards the ignition timing by an amount which increases with decreasing manifold pressure.

5. A system according to claim 4, wherein said control means ceases retarding the ignition timing when the detected manifold pressure is at or above a predetermined absolute pressure.

6. A system according to claim 1, further including:
   fourth means for detecting a temperature of air drawn into the engine; and
   wherein said control means retards the ignition timing by an amount which increases with increasing temperature.

7. A system according to claim 6, wherein said control means ceases retarding the ignition timing when the detected air temperature is at or below a predetermined temperature.

8. A system according to claim 2 wherein said control means retards the ignition timing by at least one second amount, each of said at least one second amount being smaller than said first amount.

9. A system according to claim 1, wherein said control means retards the ignition timing at cold engine starting.

10. A system according to claim 1, wherein said control means ceases retarding the ignition timing when an engine speed is at or below a predetermined speed.

11. A system according to claim 1, wherein said control means ceases retarding the ignition timing when an amount of fuel is increased at high engine load.

12. A system according to claim 1, wherein said control means ceases retarding the ignition timing when an engine speed is feedback controlled to a target idling speed.

13. A system according to claim 1, wherein said control means ceases retarding the ignition timing when a traveling speed of a vehicle on which the engine is mounted is at or below a predetermined traveling speed.

* * * * *